US006062805A

United States Patent [19]

Tremblay et al.

[11] Patent Number: 6,062,805

[45] Date of Patent: May 16, 2000

[54] VEHICULAR WHEELCHAIR STEP LIFT

[75] Inventors: Jules Tremblay, Sunland; Raymond Arnold Reynolds, Los Angeles, both of Calif.

[73] Assignee: Ricon Corporation, Panorama City, Calif.

[21] Appl. No.: 09/173,884

[22] Filed: Oct. 16, 1998

[51] Int. Cl.[7] .......... B60P 1/00

[52] U.S. Cl. .......... 414/540; 414/545; 414/558; 414/921

[58] Field of Search .......... 414/921, 540, 414/545, 557, 558; 187/200; 280/166

[56] References Cited

U.S. PATENT DOCUMENTS

| | | | |
|---|---|---|---|
| Re. 33,595 | 5/1991 | Sullivan et al. . | |
| 3,651,965 | 3/1972 | Simonelli et al. | 414/540 |
| 4,270,630 | 6/1981 | Karkau | 414/921 |
| 4,353,436 | 10/1982 | Rice et al. | 414/540 |
| 4,606,433 | 8/1986 | Smalley et al. . | |
| 4,907,936 | 3/1990 | Bourdage | 414/921 |
| 5,253,973 | 10/1993 | Fretwell | 414/545 |
| 5,316,432 | 5/1994 | Smalley et al. . | |
| 5,382,130 | 1/1995 | Kempf | 414/921 |
| 5,542,811 | 8/1996 | Vartanian | 414/921 |
| 5,556,250 | 9/1996 | Fretwell et al. | 414/921 |
| 5,674,043 | 10/1997 | Dorn | 414/921 |
| 5,865,593 | 2/1999 | Cohn | 414/921 |

*Primary Examiner*—Douglas Hess
*Attorney, Agent, or Firm*—Thomas I. Rozsa; Tony D. Chen; Jerry Fong

[57] ABSTRACT

A vehicular wheelchair step lift for persons who are physically challenged or otherwise have limited mobility. The lift includes a platform structure which is mounted to an elevator frame which is then mounted to an elevator housing for vertical movements of the platform structure. The platform structure includes a plurality of individual plates which are rotatably connected at their transverse adjacent edges for manually folding and unfolding the platform, wherein the individual plates are manually folded from an outermost individual plate against an adjacent individual plate to an innermost individual plate for stowing the platform structure into a step position of the vehicle and manually unfolded inversely such that the individual plates are substantially horizontal and in fully coplanar alignment to each other for use in an entry level position. A roll-stop plate is rotatably connected to a free edge of the outermost plate such that the roll-stop plate is manually folded for stowing, manually unfolded for use and manually raised to a vertical position for preventing a wheelchair from rolling-off the platform structure before the platform structure reaches a ground level position.

5 Claims, 6 Drawing Sheets

FIG.5
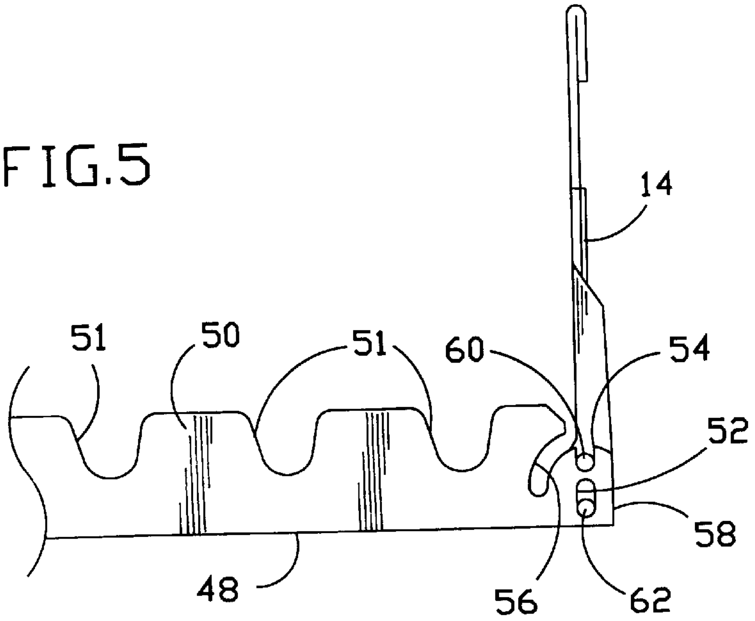
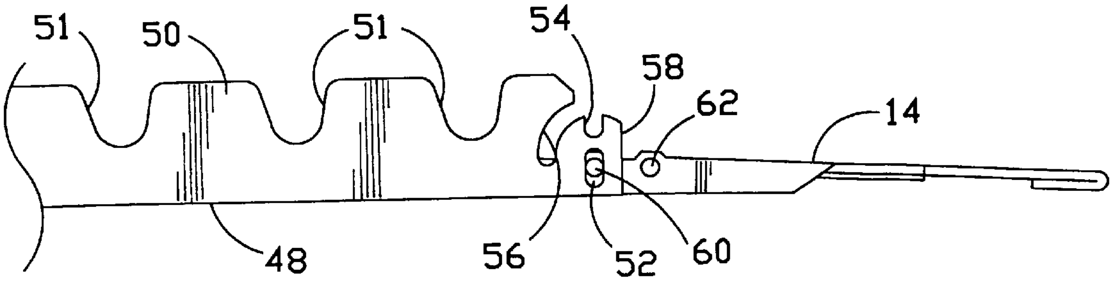
FIG.6
FIG.7
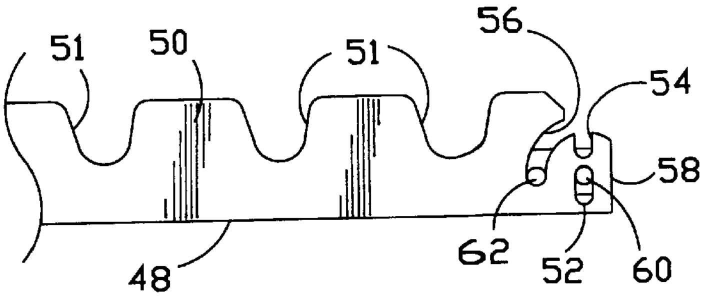

VEHICULAR WHEELCHAIR STEP LIFT

BACKGROUND OF THE INVENTION

1. Field of the Invention

The present invention relates to the field of vehicular wheelchair lifts for persons who are physically challenged or otherwise have limited mobility. More particularly, the present invention relates to the field of vehicular wheelchair step lifts with a manually foldable platform.

2. Description of the Prior Art

Specifically, automatic folding and unfolding of vehicle steps into a platform of a wheelchair lift is well known in the art. These mechanisms involve relatively complicated structures for making them more automatic and often not sufficiently reliable.

United States Patent No. Re. 33,595 issued to Sullivan et al. on May 28, 1991 discloses a wheelchair lift which utilizes a step configuration platform. It comprises a plurality of individual panels which are hinged together and extended into a geometrical plane rather than a step structure. The resulting platform is then elevationally adjusted by the driver to move the platform and a wheelchair victim on the platform, between the curb and bus floor level. The wheelchair lift further comprises a hydraulic drive for deploying the mechanisms between step and platform mode, a safety barrier structure which defines an extension of the platform to the curb level when it is dropped from its safety barrier mode, a safety locking mechanism and a stabilizing chain. The disadvantage with this platform is that it is fully automatic in folding and unfolding of the platform and the mechanism to fold and unfold the platform involves complicated structures.

U.S. Pat. No. 4,606,433 issued to Smalley et al. on Aug. 19, 1986 discloses a step convertible platform lift. It comprises a frame mounted in a rectangular notched-out floor section, which the frame comprises corner posts which also act as guides for up and down movement of the platform lift. The movable platform comprises three sections foldable into a lower step, a riser and an upper step, which sections are pivoted on shafts along their adjacent edges. The pivot shaft for upper step section and riser also is connected to reciprocating motor means for raising and lowering the platform. Lever extensions are fixedly attached to the ends of the riser, which are pivotally connected to other reciprocating motor means which unfolds the riser from an acute angle under the upper step section into a position coplanar with the upper step and at the same time moves the lower step section horizontally outwardly and upwardly into the same coplanar to form the platform. Again, the disadvantage with this platform is that it is fully automatic in folding and unfolding of the platform and the mechanism to fold and unfold the platform involves complicated structures.

U.S. Pat. No. 5,316,432 issued to Smalley et al. on May 31, 1994 discloses a wheelchair lift with an automatic barrier. Steps are convertible into a platform of an elevator for wheelchairs, during which conversion a barrier is automatically raised from the bottom step to be at the outer edge of the platform. The barrier is operated by an extensible link under the bottom step, which link is connected between the barrier and a crank arm keyed to an oscillatible transverse shaft under the inner part of the bottom step. Two additional crank arms are keyed to the ends of this shaft and are connected to a frame for a step or riser to oscillate said shaft when the steps are extended and unfolded into their platform position. The extendible link extends the barrier into a ramp when the platform is in its lowest position for access by a wheelchair. Reciprocating motors such as hydraulic pistons extend, retract, fold and unfold the panels that form the steps and their intermediate risers. When the step panels are in the platform position, additional reciprocating motors raise and lower the platform as an elevator. Stabilizing chains and rack and pinion gears insure uniform motion of the sides of the elevator and of the extendible bottom step. Still again, the disadvantage with this platform is that it is also fully automatic in folding and unfolding of the platform and the mechanism to fold and unfold the platform involves complicated structures and requires relatively large vertical space under the platform to accommodate the automatic actuating means and mechanism.

It is highly desirable to have a very efficient and also very effective design and compact construction of a vehicular wheelchair step lift which is fully automatic controlled in raising and lowering the lift movements with a manually controlled foldable platform.

SUMMARY OF THE INVENTION

The present invention is a vehicular wheelchair step lift for persons who are physically challenged or otherwise have limited mobility.

The lift includes a platform structure which is mounted to an elevator frame which is then mounted to an elevator housing for vertical movements of the platform structure. The lift moves the platform structure among an entry level position which is at the vehicle door opening, a stowed position which is inside the vehicle, and a ground level position which is outside the vehicle. The platform structure includes a plurality of individual plates which are rotatably connected at their transverse adjacent edges for manually folding and unfolding the platform, wherein the individual plates are manually folded from an outermost individual plate against an adjacent individual plate to an innermost individual plate for stowing the platform structure into a step of the vehicle positioned between the entry level position and the ground level position and manually unfolded inversely such that the individual plates are substantially horizontal and in substantially coplanar alignment to each other to form a platform for wheelchair access between the entry level position and the ground level position.

A roll-stop plate is rotatably connected to a free edge of the outermost plate such that the roll-stop plate is manually folded for stowing, manually unfolded to a substantially vertical position for preventing a wheelchair from rolling-off the platform structure before the platform structure reaches the ground level position and to a substantially horizontal position as to be an extension of the platform structure after the platform structure reaches the ground level position.

It is an object of the present invention to provide a vehicular wheelchair step lift which is fully automatic in raising and lowering a platform structure but manually controlled in folding and unfolding the plurality of individual plates of the platform structure.

It is an additional object of the present invention to provide a vehicular wheelchair step lift which comprises a platform structure having a plurality of individual plates which are manually folded onto each other for stowing the folded platform structure into a step of a vehicle and manually unfolded to form an extended platform structure for use.

It is a further object of the present invention to provide a vehicular wheelchair step lift with a simple and effective mechanism and lift structure.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 5 is a side elevational view of a roll-stop plate in a vertical raised position;

FIG. 6 is a side elevational view of the roll-stop plate in a horizontal entry position;

FIG. 7 is a side elevational view of the roll-stop plate in a horizontal folded position;

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
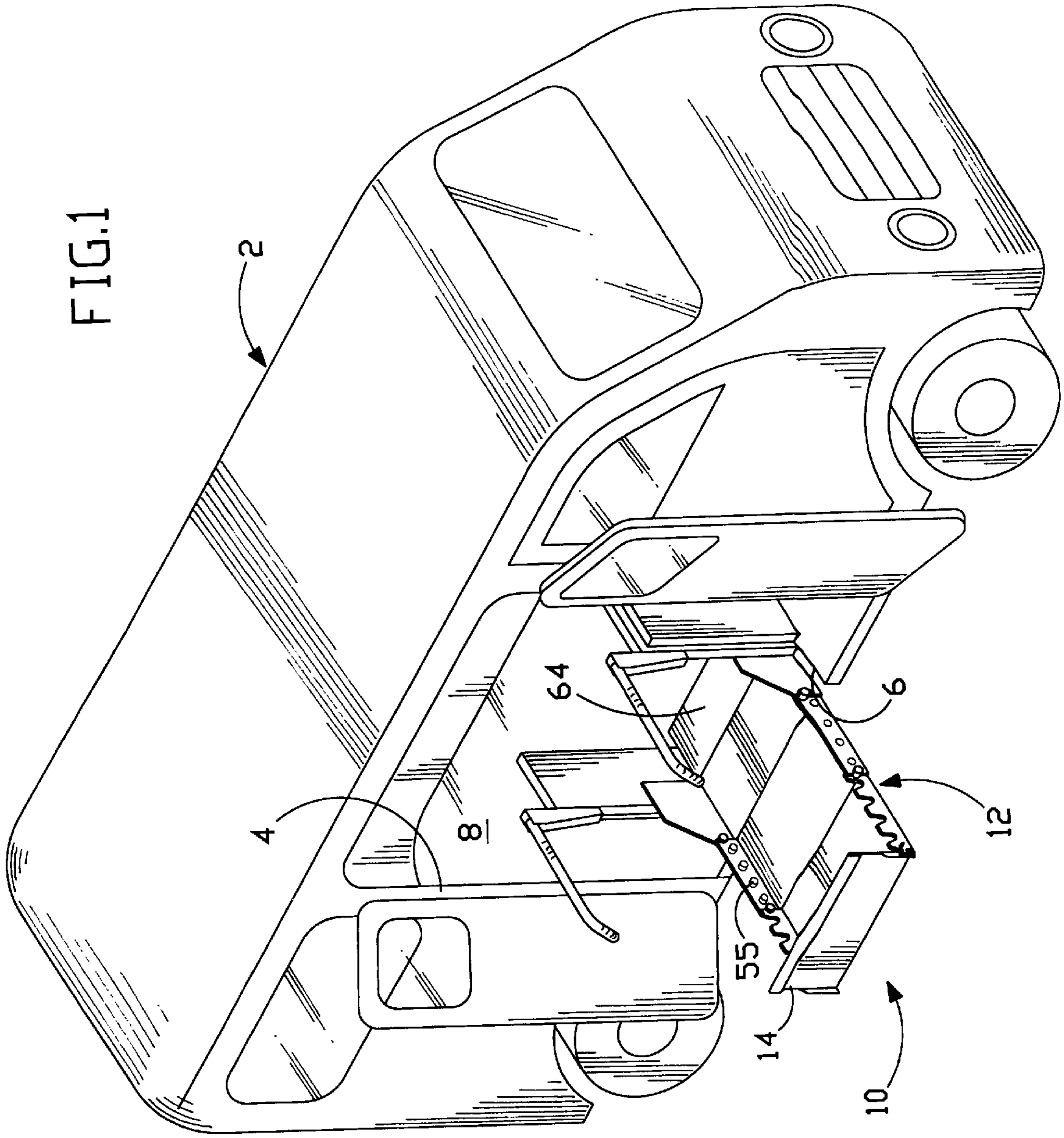
FIG. 1 is an isometric view of the present invention vehicular wheelchair step lift mounted in a vehicle, showing a platform structure in its extended platform condition in an entry level position.

Referring to FIG. 1, there is shown at 10 the present invention vehicular wheelchair step lift with its platform structure 12 in an extended or unfolded position, where the platform structure 10 is located at an entry level position (which is in the vehicle floor level position) with a roll-stop plate 14 in a vertical raised position. The wheelchair step lift 10 is mounted in a vehicle 2 adjacent an opening 4 such as a side door opening of the vehicle 2 and above a rectangular shaped opening 6 through the vehicle floor 8.

Referring to FIGS. 1, 2, 3, and 4, there is shown an elevator housing 16 which has two opposite stationary sides 17 mounted to the vehicle floor 8 by conventional means and located on opposite side of the floor opening 6. A U-channel shaped elevator frame 18 is mounted within the elevator housing 16 and located above the floor opening 6 and moves therebetween in a up or down motion. The elevator frame 18 is moved within the elevator housing 16 by two opposite side vertical reciprocating cylinder-pistons 20 (only one side is shown). Each reciprocating cylinder-piston 20 has an upper end 24 and a lower end 26. The upper end 24 of each cylinder-piston 20 is connected to the top 22 of each stationary side 17 of the elevator housing 16. The lower end 26 of each cylinder-piston 20 has a sprocket wheel 28 over which runs a sprocket chain 30 anchored at one end 34 to the bottom 32 of each stationary side 17 of the housing 16 and at the other end 36 to the elevator frame 18.

Figure 8:
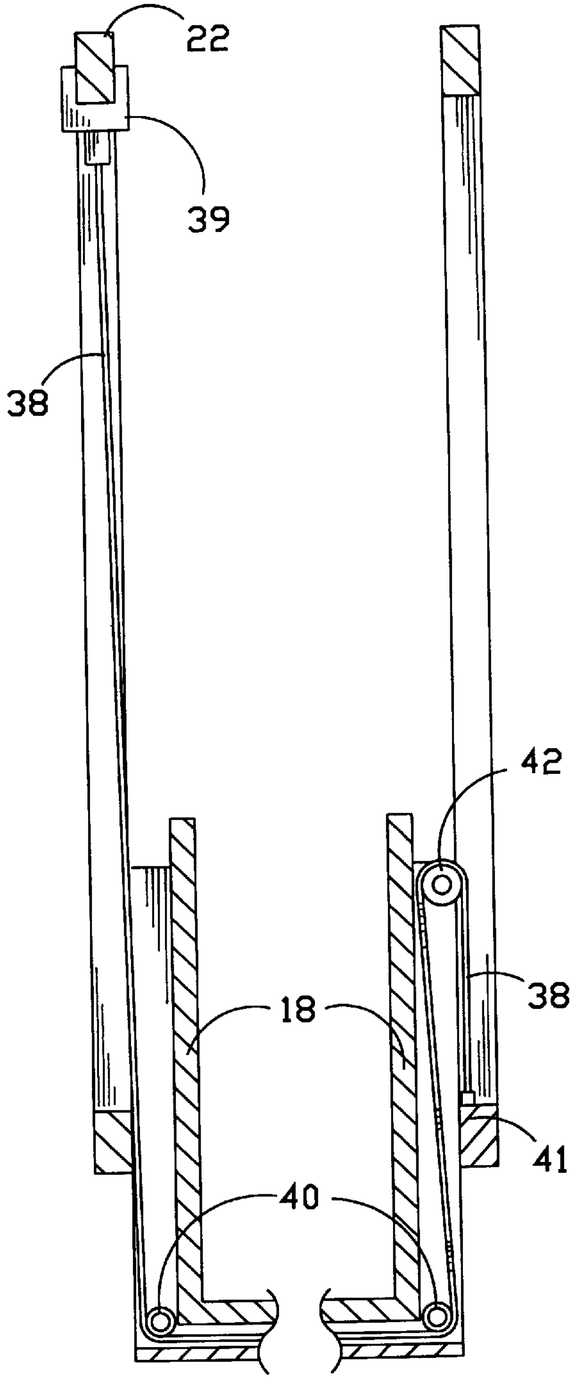
FIG. 8 is a cross-sectional view taken line 8—8 of FIG. 3, showing a stabilizing sprocket chain between the elevator housing and its frame when the elevator housing is in its lowest position.
Figure 9:
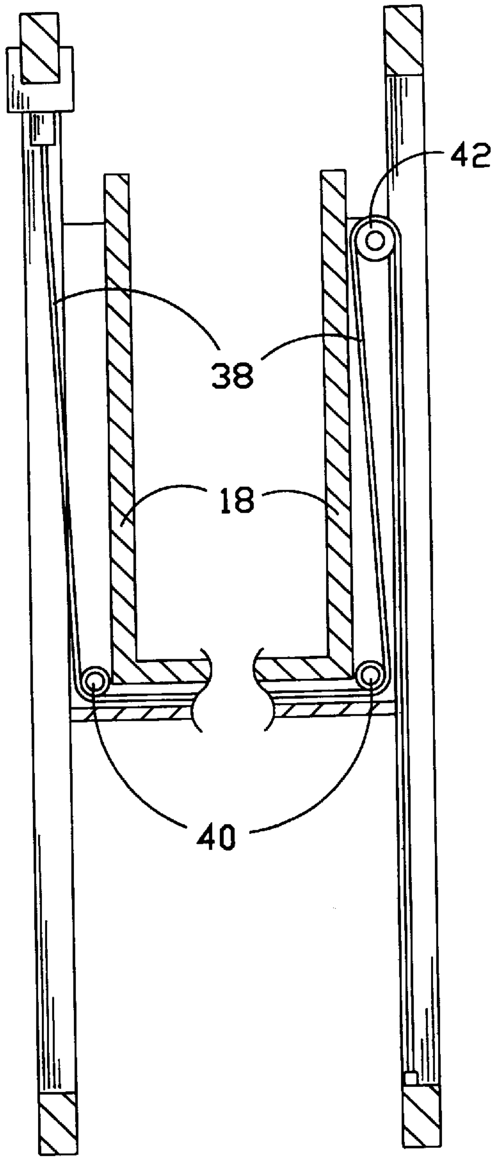
FIG. 9 is a cross-sectional view taken line 9—9 of FIG. 2, showing the stabilizing sprocket chain between the elevator housing and its frame when the elevator housing is in its highest position.

In order to stabilize the vertical movement of the elevator frame 18 there are provided similar symmetry stabilizing chains 38 (only one is shown for clarity) as shown in FIGS. 8 and 9 with the elevator frame 18 in its lower and upper positions, respectively. The chain 38 has two opposite ends 39 and 41 which are fastened or anchored to the top 22 and bottom 32 of opposite corners of the elevator housing 16, respectively. Referring to FIGS. 8 and 9, the chain 38 passes around sprocket wheels 40 located at the bottom corners of the elevator frame 18, and around another sprocket wheel 42 at the opposite upper corner of the elevator frame 18. Thus as the elevator frame 18 is moved up and down from its lower to its upper position, both sides of the elevator frame 18 will move uniformly and at the same rate and be in the same level.

Referring to FIGS. 2, 3, 5, 6, and 7, the platform structure 10 comprises an inner platform plate 44, a middle platform plate 46 and an outer platform plate 48. The inner and middle plates 44 and 46 are rotatably connected along their transverse adjacent edges, where the width of the middle plate 46 is slightly smaller than the inner plate 44 so that the middle plate 46 fits within the inner plate 44. The middle and outer plates 46 and 48 are also rotatably connected along their transverse adjacent edges, where the width of the outer plate 48 is slightly smaller than the middle plate 46 so that the outer plate 48 fits within the middle plate 46. The outer plate 48 has two opposite sidewalls 50. Each sidewall 50 has a substantially vertical aperture 52, an upper notch 54, and a curved groove 56, which are all located adjacent to the outer transverse edge 58 of the outer plate 48. Each sidewall 50 further has a plurality of spaced apart notches or grooves 51 which respectively accommodate a plurality of space apart interior protruding flanges 55 located on sidewalls 53 of the middle plate 46 (see FIG. 1), when the outer plate 48 is folded onto the middle plate 46. There is provided the roll-stop plate 14 which includes two pairs of protruding flanges 60 and 62 (only one pair of protruding flanges are shown) located on opposite sides of the roll-stop plate 14. The roll-stop plate 14 is rotatably connected to the transverse edge 58 of the outer plate 48 by respectively inserting one pair of protruding flanges 60 into the vertical apertures 52 of the outer plate 48, where the roll-stop 14 is manually moved from a folded stowed position (see FIG. 7) to a vertical raised position (see FIG. 5) to a horizontal entry level position (see FIG. 6). When the roll-stop plate 14 is in the vertical raised position, the other one pair of protruding flanges 62 rest within the top notches 54 of the outer plate 48 (see FIG. 5). When the roll-stop plate 14 is in the folded stowed position, the protruding flanges 62 rest within the curved grooves 56 of the outer plate 48 (see FIG. 7).

Figure 2:
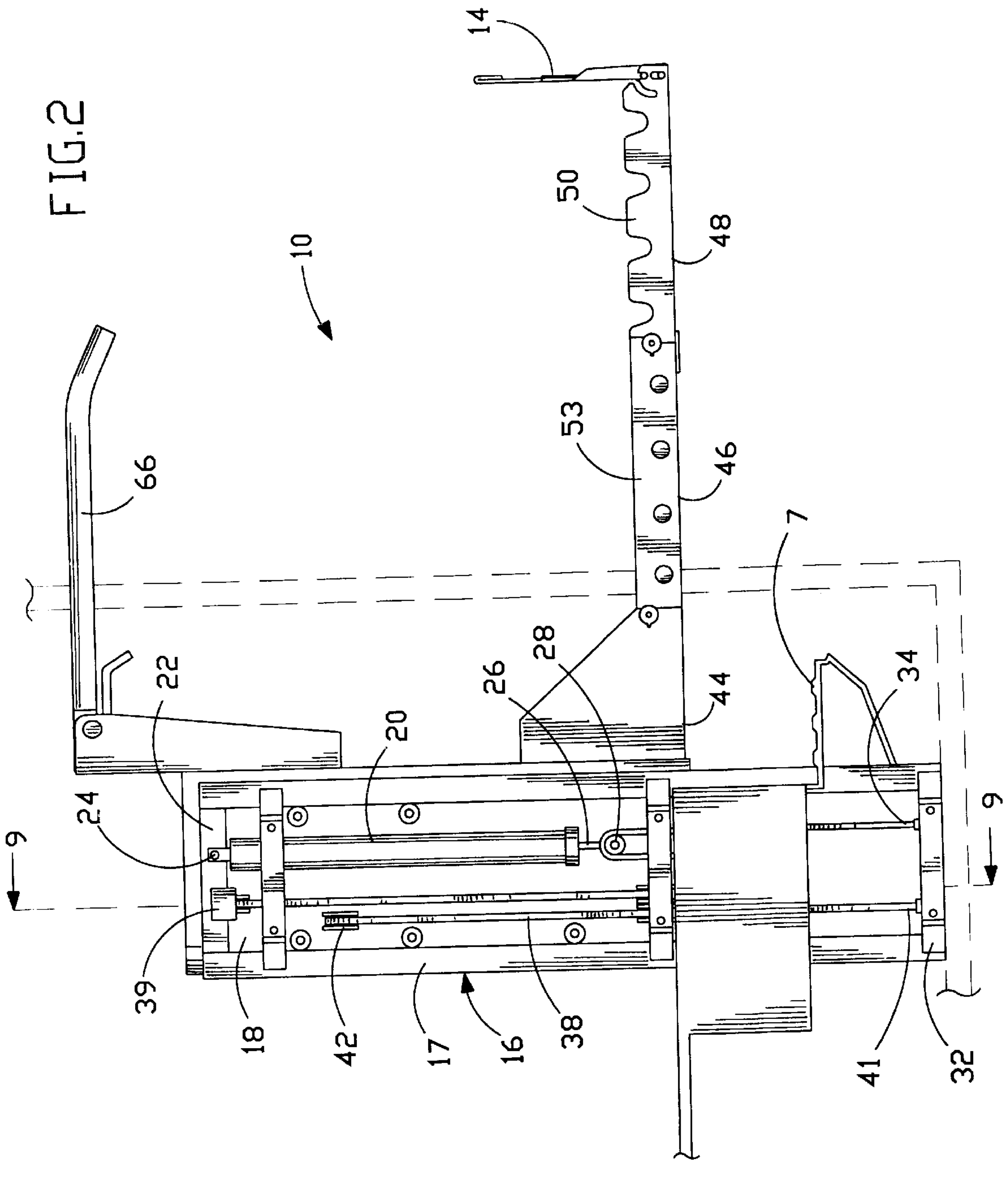
FIG. 2 is a side elevational view of the present invention vehicular wheelchair step lift, showing the platform structure unfolded in the entry level position.
Figure 3:
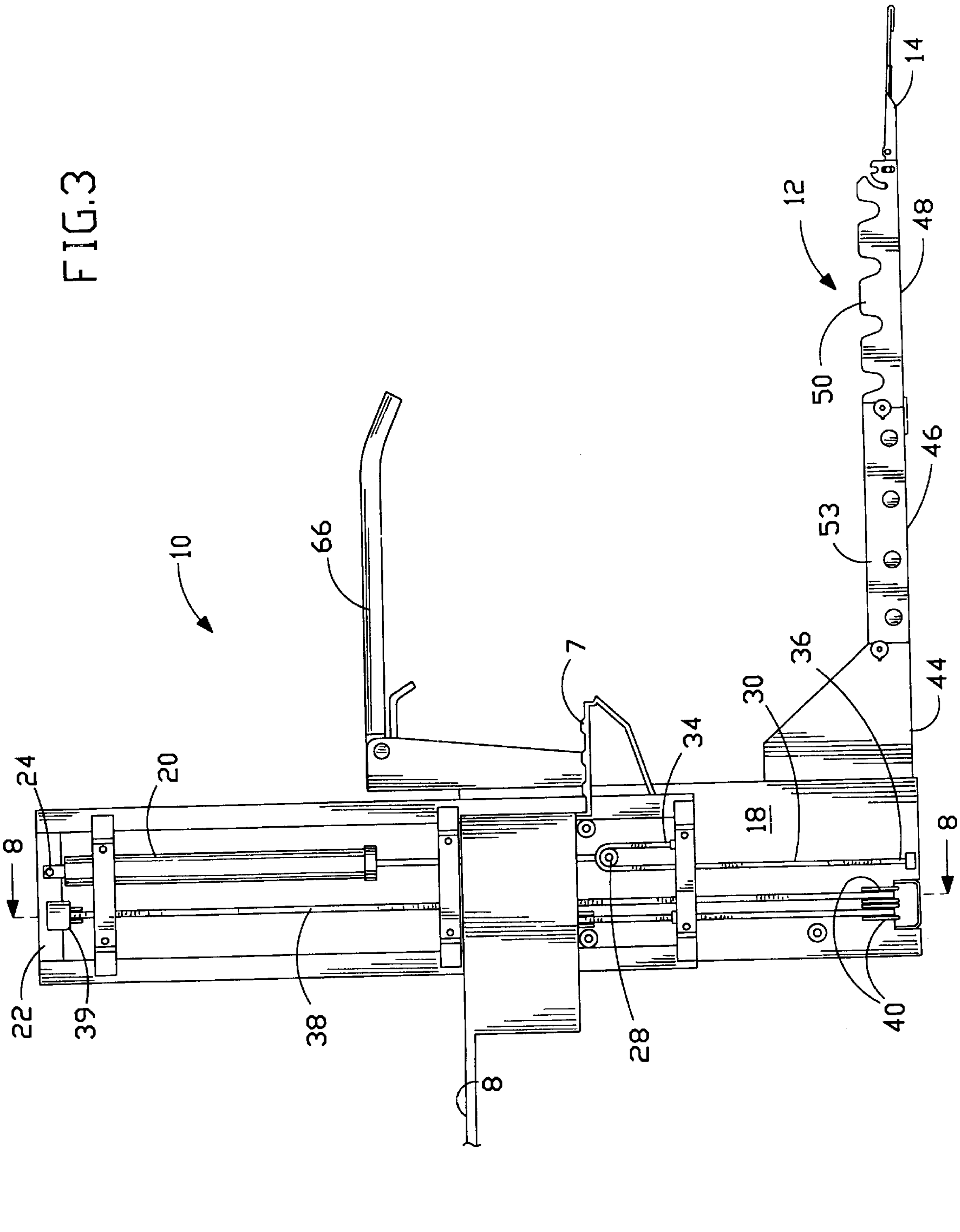
FIG. 3 is a side elevational view of the present invention vehicular wheelchair step lift, showing the platform structure unfolded in a ground level position.

Referring to FIG. 2, the platform structure 12 is deployed at the vehicle floor level position, thereby allowing a person in a wheelchair to roll on or off between the vehicle floor 8 and the platform structure 12. At this position the platform structure 12 is unfolded such that the three plates 44, 46 and 48 are substantially horizontal and in fully coplanar alignment to each other while the roll-stop plate 14 is at the vertical raised position. A bride plate 64 may be provided with the present invention vehicular wheelchair step lift 10 and is hingeably connected to a rear transverse edge of the inner plate 44 for bridging a gap space between the vehicle floor and the platform structure 12 at the entry level position.

Figure 4:
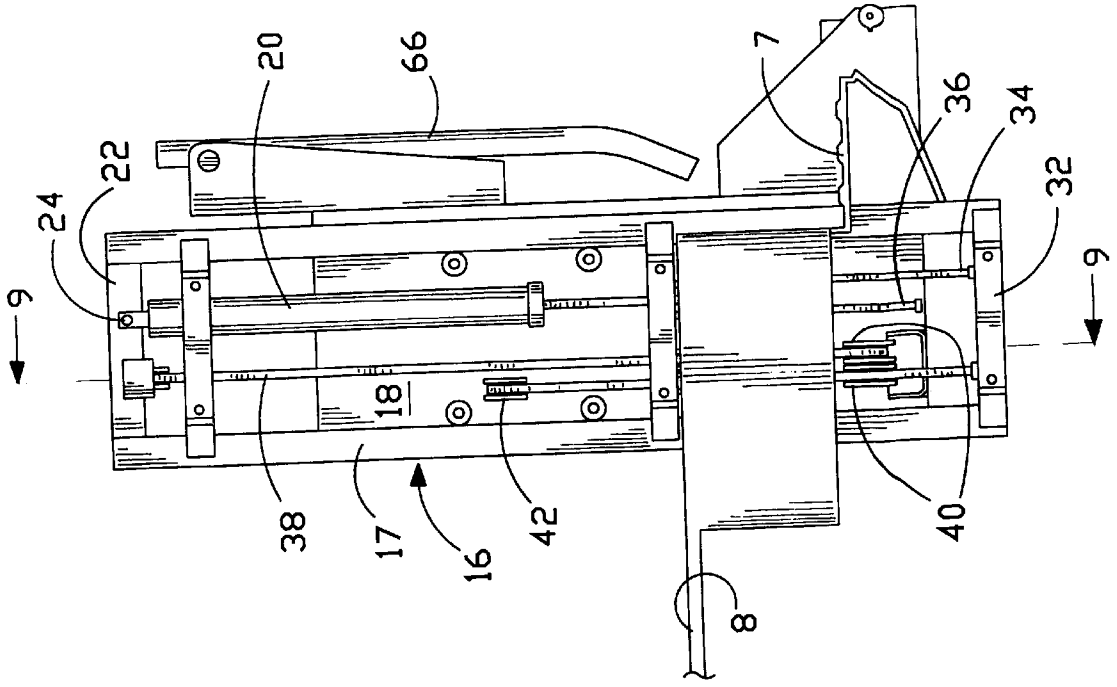
FIG. 4 is a side elevational view of the present invention vehicular wheelchair step lift, showing the platform structure folded in a stowed position.

Referring to FIG. 4, in the stowed position, the platform structure 12 is lowered to a step position 7 of the vehicle 2, where the roll-stop plate 14 is manually folded against the upperside of the outer plate 48 which in turn the roll-stop plate 14 and the outer plate 48 are manually folded against the upperside of the middle plate 46, which in turn the roll-stop plate 14, the outer plate 48 and the middle plate 46 are manually folded against the upperside of the inner plate 44.

Also there may be a portable pushbutton control box (not shown) which is provided with the vehicular wheelchair step lift for controlling the vertical movements of the wheelchair step lift. A pair of opposite handrails 66 are provided with the present invention vehicular wheelchair step lift 10 and are mounted to the front end of the elevator frame 18. These handrails 66 may be manually or automatically extended or folded downwardly into a stowed position. Furthermore, there may be a position limit switch or sensor (not shown) mounted on the roll-stop plate 14, so that it ensures the roll-stop plate 14 is in the vertical locking position before the lift moves up and down.

The present invention conforms to conventional forms of manufacture or any other conventional way known to one skilled in the art.

Defined in detail, the present invention is a wheelchair step lift for used in conjunction with a vehicle having a door opening and a floor opening, the lift comprising: (a) an elevator housing being mountable to a floor of the vehicle and located on opposite sides of the floor opening; (b) an elevator frame mounted to the elevator housing for vertical movements and located adjacent to the floor opening; (c) a platform structure mounted to the elevator frame and having an inner plate, a middle plate and an outer plate, which are all rotatably connected at their transverse adjacent edges, wherein the outer plate is manually folded against the upperside of the middle plate which in turn the outer and middle plates are manually folded against the upperside of the inner plate for stowing the platform structure in a step position of the vehicle, and manually unfolded inversely for use in an entry level position; and (d) a roll-stop plate rotatably connected to a free transverse edge of the outer plate and manually folded for stowing, and manually unfolded to a vertical position for preventing a wheelchair from rolling off the platform structure before the platform structure reaches a ground level position.

Defined broadly, the present invention is a wheelchair step lift for used in conjunction with a vehicle having an opening and a floor opening, the lift comprising: (a) a housing being mountable to a floor of the vehicle and located on opposite sides of the floor opening; (b) a frame mounted to the housing for vertical movements and located adjacent to the floor opening; and (c) a platform structure mounted to the frame and having a plurality of individual plates which are rotatably connected at their adjacent edges, wherein the individual plates are manually folded from an outermost individual plate against an adjacent individual plate to an innermost individual plate for stowing the platform structure into a step position of the vehicle and manually unfolded inversely for use.

Defined more broadly, the present invention is a step lift for used in conjunction with a vehicle having an opening, the lift comprising a platform having at least two individual plates rotatably connected at their adjacent edges, wherein one of the at least two individual plates is manually folded for stowing the platform in a step position of the vehicle and manually unfolded such that the at least two individual plates are substantially horizontal and coplanar to each other for use.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A step lift for used in conjunction with a vehicle having an opening, the lift comprising:

a. a platform having at least two individual plates rotatably connected at their adjacent edges, wherein one of the at least two individual plates is manually folded for stowing the platform in a step position of the vehicle and manually unfolded such that the at least two individual plates are substantially horizontal and coplanar to each other for use;

b. means for preventing a wheelchair from rolling-off said platform structure before said platform structure reaches a ground level position, the means including a roll-stop plate rotatably connected to a free edge of said one of said at least two individual plates and manually folded for stowing, and manually unfolded to a vertical position for preventing the wheelchair from rolling-off said platform structure; and c. said roll-stop having two pairs of opposite adjacent protruding flanges, wherein one pair of protruding flanges are secured to said one of said at least two individual plates and the other pair of protruding flanges are movably secured to notches on said one of said at least two individual plates for maintaining said roll-stop plate in the vertical position.

2. The step lift in accordance with claim 1 further comprising an elevator housing being mountable to a floor of the vehicle and located on opposite sides of a floor opening.

3. The step lift in accordance with claim 2 further comprising an elevator frame mounted to said elevator housing and located above said floor opening for vertical movements of said platform structure.

4. A wheelchair step lift for used in conjunction with a vehicle having an opening and a floor opening, the lift comprising:

a. a housing being mountable to a floor of said vehicle and located on opposite sides of said floor opening;

b. a frame mounted to said housing for vertical movements and located adjacent to said floor opening;

c. a platform structure mounted to said frame and having a plurality of individual plates which are rotatably connected at their adjacent edges, wherein the individual plates are manually folded from an outermost individual plate against an adjacent individual plate to an innermost individual plate for stowing the platform structure into a step position of said vehicle and manually unfolded inversely for use, and means for preventing a wheelchair from rolling-off said platform structure before said platform structure reaches a ground level position, the means including a roll-stop plate rotatably connected to a free edge of said outermost individual plate, and manually folded for stowing, and manually unfolded to a vertical position for preventing the wheelchair from rolling-off said platform structure, the roll-stop plate having two pairs of opposite adjacent protruding flanges, wherein one pair of protruding flanges are secured to said outermost individual plate and the other pair of protruding flanges are movably secured to notches on said outermost individual plate for maintaining said roll-stop plate in the vertical position.

5. A wheelchair step lift for used in conjunction with a vehicle having a door opening and a floor opening, the lift comprising:

a. an elevator housing being mountable to a floor of said vehicle and located on opposite sides of said floor opening;

b. an elevator frame mounted to said elevator housing for vertical movements and being located above said floor opening;

c. a platform structure mounted to said elevator frame and having an inner plate, a middle plate and an outer plate, which are all rotatably connected at their transverse adjacent edges, wherein the outer plate is manually folded against the upperside of the middle plate which in turn the outer and middle plates are manually folded against the upperside of the inner plate for stowing the platform structure in a step position of said vehicle, and manually unfolded inversely for use in an entry level position; and d. a roll-stop plate rotatably connected to a free transverse edge of said outer plate and manually folded for stowing, and manually unfolded to a vertical position for preventing a wheelchair from rolling off said platform structure before said platform structure reaches a ground level position, the roll-stop plate having two pairs of opposite adjacent protruding flanges, wherein one pair of protruding flanges are secured to said outer plate and the other pair of protruding flanges are movably secured to notches on said outer plate for maintaining the roll-stop plate in the vertical position.

* * * * *